W. E. FERRIS.
SHOCK ABSORBING AND UNIVERSAL JOINT DRAW BAR.
APPLICATION FILED APR. 19, 1917.

1,289,141.

Patented Dec. 31, 1918.

Inventor
W. E. Ferris
By G. E. Dunstan,
his Attorney

UNITED STATES PATENT OFFICE.

WILLIAM E. FERRIS, OF EAST CLEVELAND, OHIO, ASSIGNOR TO THE OHIO TRAILER COMPANY, OF CLEVELAND, OHIO, A CORPORATION OF OHIO.

SHOCK-ABSORBING AND UNIVERSAL-JOINT DRAW-BAR.

1,289,141.                     Specification of Letters Patent.      Patented Dec. 31, 1918.

Application filed April 19, 1917. Serial No. 163,153.

*To all whom it may concern:*

Be it known that I, WILLIAM E. FERRIS, a citizen of the United States, residing at East Cleveland, in the county of Cuyahoga and State of Ohio, have invented certain new and useful Improvements in Shock-Absorbing and Universal-Joint Draw-Bars, of which the following is a specification.

This invention relates to drawbars for connecting trailers to automobiles or other vehicles, and has for its principal object to provide a drawbar of simple and practical construction, which will serve as a shock absorber and also permit a universal joint action.

With the above and other objects in view as will be readily understood, the invention will be hereinafter fully described with reference to the accompanying drawings, which simply illustrate the same, and the novel features thereof will be distinctly pointed out in the appended claim.

In the drawings like characters of reference indicate corresponding parts.

Figure 1:
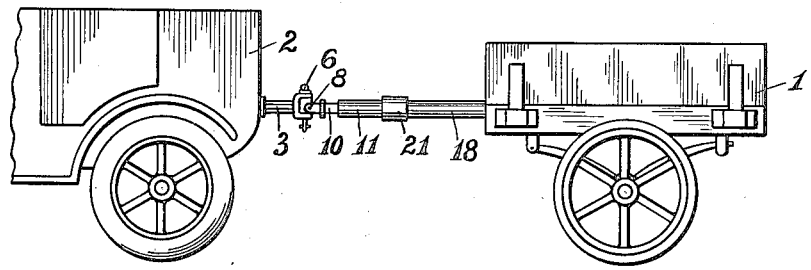
Figure 1 is a side view of a trailer attached to an automobile by a drawbar constructed in accordance with my invention.
Figure 2:
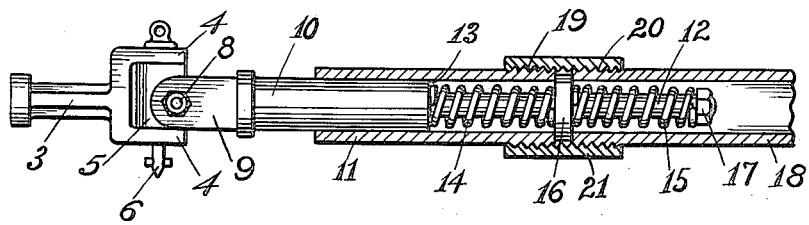
Fig. 2 is a view of the main part of the drawbar looking toward the side, part being in section to better show the construction.
Figure 3:
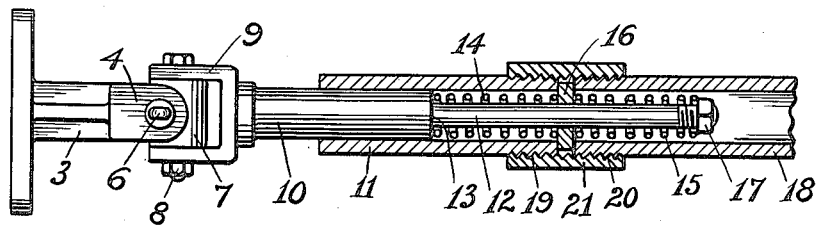
Fig. 3 is a similar view looking down upon the same.

Referring to the drawings, 1 represents an ordinary trailer such as is attached to an automobile or other vehicle indicated by 2. Fixed to the rear end of the automobile is a bracket 3 having a pair of horizontal spaced lugs 4, between which is adapted to be pivoted a vertical boss 5 of a universal joint member by means of a coupling pin 6. To a transverse boss 7 of said universal joint member is pivotally connected, by a bolt 8, a bifurcated head 9 of a cylindrical plunger 10. This plunger is adapted to slide longitudinally and also rotate in a tubular guide 11. Extending from the end of the plunger is a rod 12 of less diameter than the same, thereby forming a shoulder 13. A pair of similar coiled springs 14 and 15 are arranged upon the rod 12 for the purpose of serving as shock absorbers. The spring 14 is interposed between the shoulder 13 and a separating disk 16, which is freely mounted upon the rod, and the other spring 15 between the disk and a nut 17 on the end of the rod. Said separating disk is rigidly held against movement between the end of the tubular guide 11 and the end of a similar tubular tongue or pole 18, fixed to the frame of the trailer, which ends are suitably threaded at 19 and 20, and connected together by a union 21. For securing greater tension on the coiled springs 14 and 15, the nut 17 may be adjusted as desired.

It will be noted that the plunger 10 is capable of sliding longitudinally and also rotating in the guide 11, and the same freedom of movement is permitted the rod 12 in the spring separating disk 16. As the plunger 10 and the tongue or pole 18 are pivotally connected at 6 and 8 to the universal joint member, so that they may swing at right angles to each other, and as the plunger is also capable of rotary movement, all twisting strain between the connecting parts will be eliminated. On account of the separating disk 16 acting against the ends of the coiled springs 14 and 15, all shocks from longitudinal movements of the connecting parts are avoided and a smooth resilient action is obtained. This drawbar has been designed to give the various movements mentioned so that the trailer can readily adapt itself to the roadbed or turn corners without causing any binding action at the connection between the same and the tongue of the trailer.

It will be understood that slight changes in the details of construction and arrangement of the parts may be made within the scope of the claim.

Having fully described my invention, what I claim is:—

In a drawbar, the combination of a plunger, a guide, the plunger being slidably mounted in the guide, a rod extending from the plunger within the guide and forming therewith a shoulder, a disk, the rod passing freely through the disk, a tubular pole, the disk being arranged between the ends of said guide and said tubular pole, a union for securing the guide to the pole and binding the disk therebetween, a coiled spring on the rod and interposed between said shoulder and said disk, a second coiled spring on the rod and having one end in engagement with said disk, and means carried by the rod for engaging the other end of the second coiled spring, substantially as described.

In testimony whereof I affix my signature.

WILLIAM E. FERRIS.